United States Patent [19]

Fletcher et al.

[11] 3,905,356

[45] Sept. 16, 1975

[54] SUBMINIATURE INSERTABLE FORCE TRANSDUCER

[76] Inventors: James C. Fletcher, Administrator of the National Aeronautics and Space Administration, with respect to an invention of Robert H. Silver, Van Nuys, Calif.; Gilbert W. Lewis, Arcadia, Calif.; Cyril Feldstein, Sierra Madre, Calif.; Edward N. Duran, Pasadena, Calif.

[22] Filed: May 15, 1974

[21] Appl. No.: 470,429

[52] U.S. Cl. .................. 128/2 S; 338/2; 73/88.5
[51] Int. Cl.² ............................................ A61B 5/10
[58] Field of Search ................... 128/2 S, 2 N, 2 R; 73/88.5; 338/2, 5, 6

[56] References Cited
UNITED STATES PATENTS

| | | | |
|---|---|---|---|
| 2,815,424 | 12/1957 | Painter | 338/6 |
| 3,242,449 | 3/1966 | Stedman | 338/2 |
| 3,246,385 | 4/1966 | King | 338/2 |
| 3,273,559 | 9/1966 | Evans | 128/2 S |
| 3,416,012 | 12/1968 | Jackson et al. | 338/2 |
| 3,474,776 | 10/1969 | O'Brien | 128/2 S |
| 3,614,950 | 10/1971 | Rabey | 128/2 S |

Primary Examiner—Richard A. Gaudet
Assistant Examiner—Lee S. Cohen
Attorney, Agent, or Firm—Monte F. Mott; Paul F. McCaul; John R. Manning

[57] ABSTRACT

A sub-miniature transducer suitable for measuring forces at a predetermined location within muscle tissue, including a small diameter tube with a slit at the lower end that forms a pair of tines, and a strain gauge fixed within the tube to one of the tines for measuring slight deflections of the tine. The tube can be inserted into muscle tissue to measure forces at a location deep within the tissue and with minimal disturbance to the tissue, and the tube can be turned to any orientation to measure forces in different direcitons.

6 Claims, 5 Drawing Figures

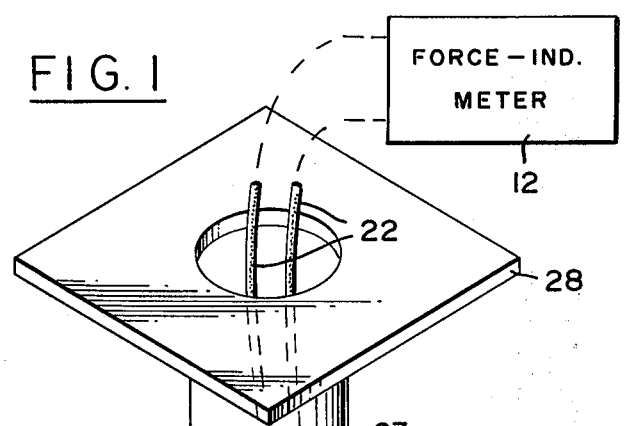
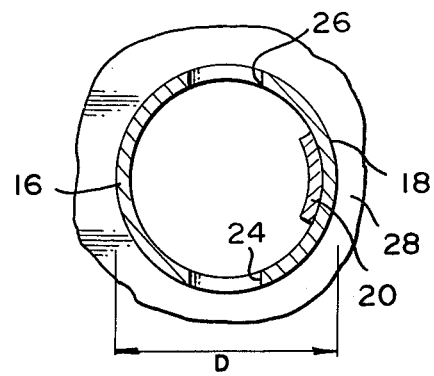
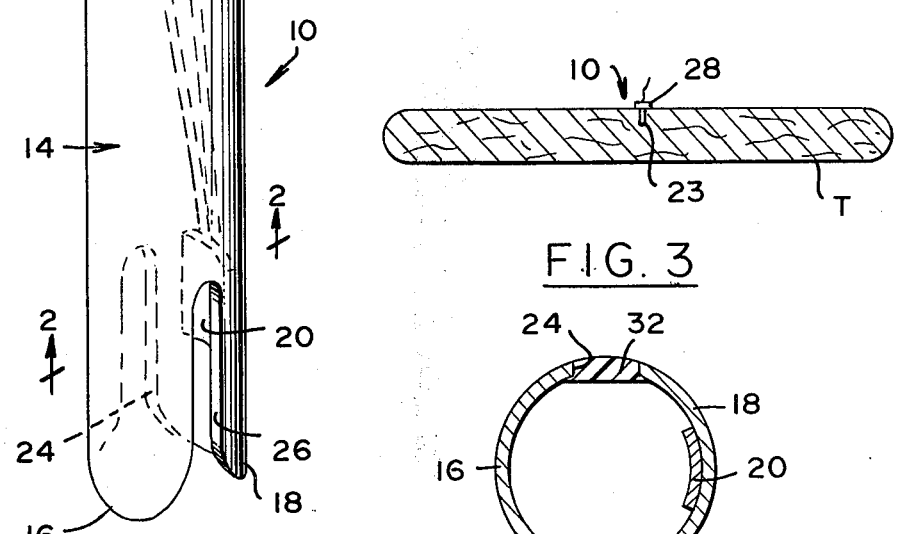
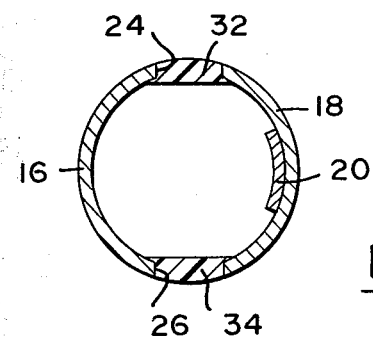
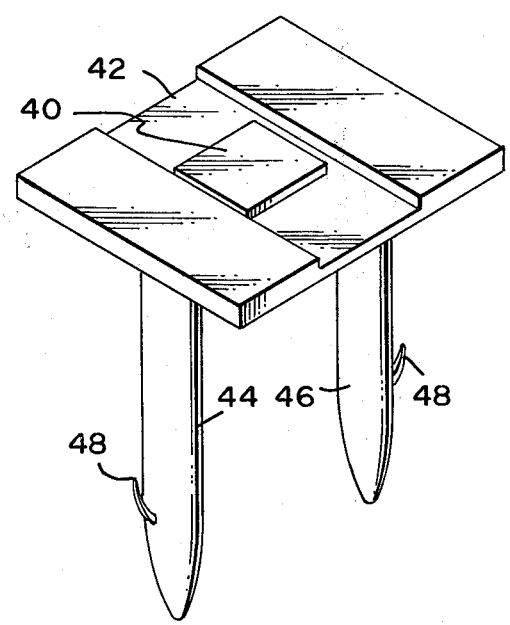

SUBMINIATURE INSERTABLE FORCE TRANSDUCER

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

This invention relates to force transducers.

Research involving behavior of the heart has been handicapped because of the lack of suitable transducers for measuring the level of muscle contractions. Relatively large transducers have been attached to the external surface of the muscle, with the transducers being of low compliance. However, the relatively large size of the transducers has caused some interference with tissue activity, and the transducers have generally been limited to measuring activity only at the surface of the tissue or over large areas. The fact that the transducer lay on the outside of the tissue where it was subjected to high intensity lights used in operating rooms as well as other sources of heating and cooling, often resulted in the need for temperature compensation for the strain gauge element of the transducer.

SUMMARY OF THE INVENTION

In accordance with one embodiment of the present invention, a force transducer is provided which can be rapidly emplaced in a body of material to measure forces at a desired location deep within the material. The transducer includes a penetrator having a pair of tines with tapered outer ends for penetrating a body of material, and a strain gauge mounted on one of the tines or on a beam connecting the tines for measuring deflections of the tines. In one transducer, the penetrator is a small diameter tube, such as a portion of a hypodermic needle, with a slit at one end that forms a pair of tines. A strain gauge is mounted on the inner surface of one of the tines, and electrical wires connected to the strain gauge pass through the tube to the outer end thereof for connection to a resistance measuring meter. The small diameter tube can be readily inserted into a body of soft material, and finds particular use in measuring forces at a predetermined depth within muscle tissue. The small diameter of the tube permits it to be easily inserted and with minimal disruptive effect on the muscle tissue. The small size also permits the use of tines that are highly resistant to deflection without affecting the tissue, so that the device can measure forces applied by the muscle tissue. The small tube can be easily rotated while it lies in the muscle tissue, to permit force measurements in different directions. The fact that the strain gauge lies deep within the tissue means that it is immersed in blood and therefore the temperature of the gauge is held constant so that accurate measurements can be made without the need for temperature compensation.

The novel features that are considered characteristic of this invention are set forth with particularity in the appended claims. The invention will best be understood from the following description when read in connection with the accompanying drawings.

BRIEF DESCRIPTION OF THE DRAWINGS

FIG. 1 is a perspective view of a transducer constructed in accordance with one embodiment of the present invention;

FIG. 2 is a sectional view taken on the line 2—2 of FIG. 1;

FIG. 3 is a sectional view of a body of muscle tissue showing the manner in which the transducer of FIG. 1 is installed thereon;

FIG. 4 is a sectional view of another transducer similar to that of FIG. 2, except that it includes low modulus material for filling the space between the tines; and FIG. 5 is a perspective view of a transducer constructed in accordance with still another embodiment of the invention.

DESCRIPTION OF THE PREFERRED EMBODIMENTS

FIG. 1 illustrates a force measuring system that is especially useful for measuring forces within muscle tissue, which includes a transducer 10 designed for application to the tissue and a force indicating meter 12 coupled to the transducer for indicating the level of force. The transducer includes a penetrator 14 which is designed to penetrate into a body of material such as muscle tissue, and which includes a pair of tines 16, 18 at the outer end of the penetrator which are deflected as the muscle tissue contracts and expands. A strain gauge sensing element 20 which is attached to one of the tines 18, undergoes a change in resistance as the tine 18 deflects. A pair of electrical conductors 22 connected at one end to the strain gauge 20 and connected at their other end to the meter 12, enable the meter to be used to measure changes in the resistance of the strain gauge and therefore to indicate deflections of the tine 18. The transducer 10 can be calibrated to determine the change in resistance in the strain gauge element for various forces applied to the tines, so that the meter 12 can directly indicate the level of forces applied to the tines.

The penetrator 14 includes a small diameter tube 23 such as the needle of a hypodermic syringe, with a pair of longitudinal slots 24, 26 at its lower end for forming the tines 16, 18. The upper portion of the tube 23 therefore serves as an elongated holder for holding the tines. Each of the tines 16, 18 is ground to a taper or point at its outer end to facilitate penetration into a body of material. A limit plate 28 is attached to an end of the tube opposite the tines, to limit the depth of insertion of the tube into a body of material and to facilitate withdrawal of the transducer. The strain gauge 20 is mounted on a face of the tine 20 which lies within the tube, and the conductors 22 extend through the tube to the outer end thereof from whence they extend to the meter 12. The strain gauge 20 is preferably coated with an insulation material such as epoxy to prevent electrical shock to the tissue.

The transducer 10 may be utilized in the manner indicated in FIG. 3 to measure forces within muscle tissue T such as the muscle tissue of the heart, by inserting the tube 23 into the tissue. A piece of tape may be applied over the end plate 28 to hold the transducer in place, if this is deemed necessary. The transducer then measures forces applied against it by the muscle tissue as the tissue contracts. The tines 16, 18 are highly resistant to deflection, so that only very small deflections occur. However, commonly available strain gauges 20 can readily indicate the magnitude of minute deflections, so that accurate force measurements can be made. The instrument can be calibrated prior to insertion into the tissue by laying various weights upon the tines and measuring the resulting resistance of the strain gauge element. The fact that the transducer 10 has low compliance, or in other words is highly resistant to deflection, means that the forces exerted by the muscle tissue can be measured rather than merely movements. Transducers commonly used in the past to measure the dynamic action of muscle tissue of the heart or other area have generally been large devices of low compliance. However, such large mass transducers reinforce the tissue and disturb the force field, so that they do not accurately measure the force which the muscle tissue exerts. By utilizing a small diameter and low mass transducer with low compliance, the transducer produces minimal interference with normal muscle action, and yet the forces which the muscle exerts can be measured.

The installation, of the transducer by insertion into the muscle tissue, provides important advantages over prior art transducer installations wherein the transducers were merely applied to the surface of the tissue. One advantage is that forces can be measured at a desired depth within the muscle tissue, with the length of the tube 23 or the depth at which it is inserted being chosen so that the tines lie at a desired depth within the tissue. Another advantage of penetration into the tissue is that it results in the strain gauge 20 remaining at a known temperature. Strain gauges are normally sensitive to temperature variations, so that precise measurements require either a knowledge of the temperature of the strain gauge or the provision of apparatus for making automatic temperature compensations. Where the transducer is large and lies only on the surface of the tissue, temperature variations can readily occur because of the high intensity lights typically used in operating rooms or from other factors. However, in the present invention, the fact that the transducer 20 lies within the muscle tissue means that it will be immersed in blood that is flowing through the tissue. The temperature of the blood is maintained constant, and therefore the need for automatic temperature compensation is eliminated.

The tube 23 should be of small diameter and is preferably no wider than the diameter D of one millimeter (about 0.040 inch) indicated in FIG. 2. This has the advantage of minimizing disturbance of the muscle tissue. In addition, the small diameter tube tends to displace the fibers of the muscle to either side of the tines 16, 18 rather than to trap the fibers of the muscle tissue between This, tines. Thus, plus the fact that the tines and the rest of the tube are round, means that the transducer 10 can be easily rotated to various orientations while it lies inserted in the muscle tissue, and with little if any damage to the tissue. An operator can easily rotate the transducer to measure forces applied by the tissue in various directions. In order to further minimize the trapping of tissue between the tines, the slots 24, 26 can be closed as in the manner shown in FIG. 4 wherein slot-blocking material at 32 and 34 fills part of the space between the tines 16, 18. The material at 32 and 34 is of low modulus of compression such as silicone rubber so it does not substantially affect deflection of the tines.

The transducer can be constructed in a variety of configurations. FIG. 5 illustrates a configuration wherein a strain gauge 40 is utilized which is mounted on a plate 42 that couples a pair of tines 44, 46 to measure deflection of the tines by the material into which the tines have been inserted. Each of the tines 44, 46 is formed with a barb 48 to help hold the tines in place in the body of material. The tines 44, 46 in this embodiment of the invention are separate pins which are tapered or pointed at their inner ends in order to facilitate penetration of a body of material.

Thus, the invention provides a transducer for measuring forces or stresses in a body of material. The transducer is useful with a variety of easily penetrated materials such as polymers, and is especially useful for measuring forces in animal tissue. The transducer includes a pair of tines that are tapered at their inner ends to facilitate penetration into a body of material, and a strain gauge element or the like is coupled to the tines to measure deflections. In one embodiment of the invention, shown in FIGS. 1–3, the tines are at the end of a holder to permit insertion deep into the material, with the holder and tines being portions of a small diameter tube to facilitate deep insertion of the tines and to facilitate rotation of the transducer to measure forces in different directions. The transducer is especially useful in the measurement of forces in muscle tissue, because the small size minimizes disruption of the normal activity of the tissue and the curvature of the tines permits rotation with minimal if any damage to the tissue. The fact that the strain gauge lies deep within the tissue where it is immersed in blood eliminates the needs for temperature compensation.

Although particular embodiments of the invention have been described and illustrated herein, it is recognized that modifications and equivalents may readily occur to those skilled in the art and consequently, it is intended that the claims be interpreted to cover such modifications and equivalents.

What is claimed is:

1. Apparatus for measuring forces in a body of material comprising:

a material penetrator including a plurality of tines with tapered outer ends for penetrating a body of material; and strain gauge means coupled to said penetrator to measure deflections of at least one of said tines;

said penetrator including a tube of substantially circular cross section, with a pair of substantially longitudinally-extending slots at one end forming a pair of curved tines, whereby to facilitate rotation of the penetrator to measure stresses in different directions.

2. The apparatus described in claim 1 wherein:

said tines are separated by no more than about one millimeter, whereby to enable insertion into muscles of the human body without trapping appreciable muscle fibers between the tines so that rotation of the penetrator can occur with little if any damage.

3. A transducer for measuring forces comprising:

a tube having a pair of substantially longitudinally-extending slots at a first end that form a pair of tines with tapered ends;

a strain gauge sensing element mounted on the inside of the tube on one of said tines; and electrical conductor means coupled to said strain gauge element and extending through said tube to a second end thereof which is opposite said first end.

4. The transducer described in claim 3 including:
a quantity of material of much lower modulus of compression than the material of said tines lying in said slots between said tines, whereby to minimize filling up of the space between the tines.

5. A method for measuring forces in animal tissue comprising:
inserting a transducer which includes a pair of tines and a strain gauge element coupled to at least one of the tines, deeply enough into the animal tissue so that the strain gauge element is completely immersed in blood of the animal tissue; and
allowing current to pass through the strain gauge element and measuring the level of the resistance whereby to determine deflection of a tine and therefore the force exerted by the tissue.

6. The method described in claim 5 including:
rotating said transducer while it lies inserted in the animal tissue, whereby to measure forces in another direction.

* * * * *